July 16, 1968 — W. D. CRAMER — 3,392,890
PLIABLE MATERIAL SUPPORTING METHOD AND APPARATUS
Filed Sept. 13, 1963 — 4 Sheets-Sheet 1
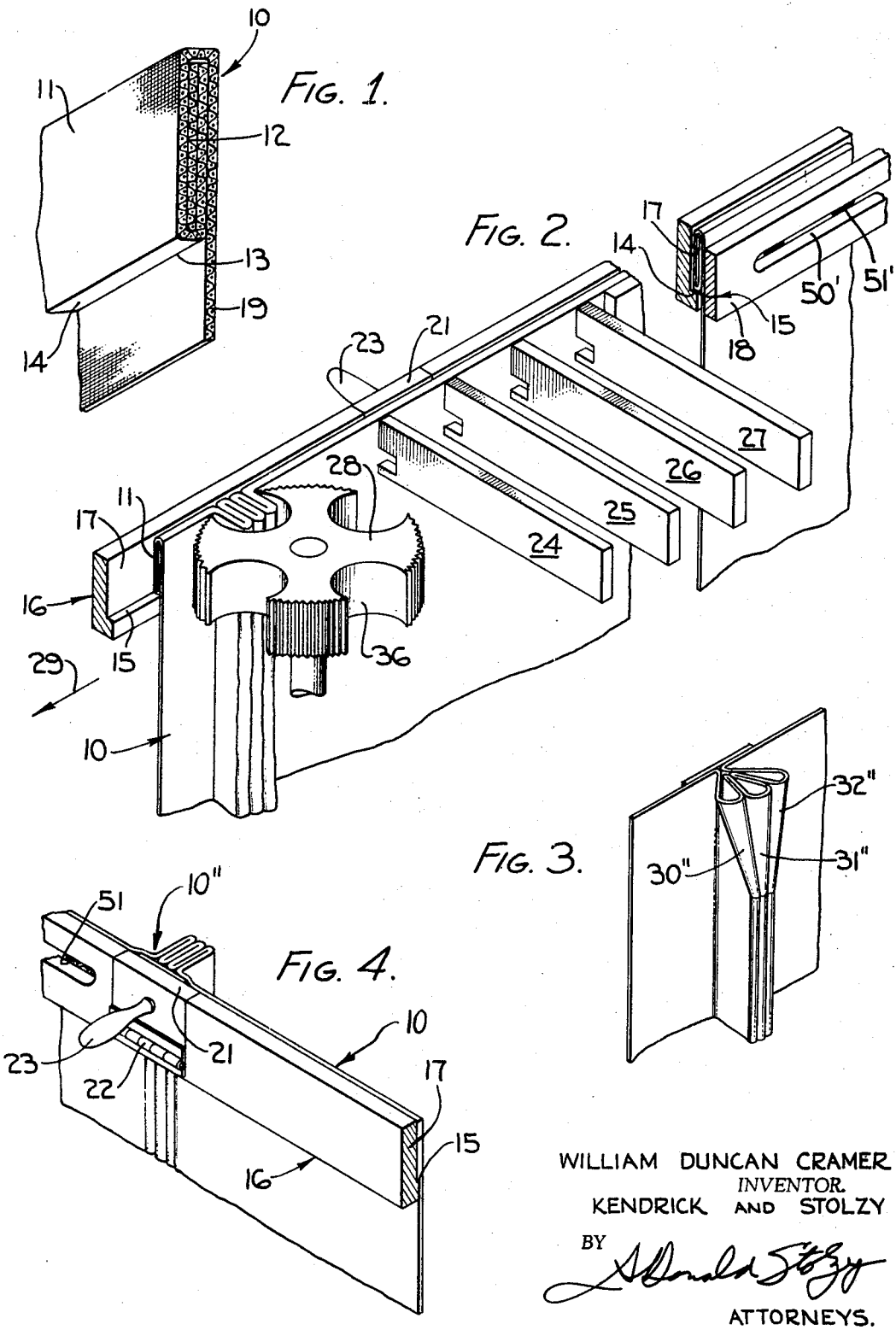
WILLIAM DUNCAN CRAMER
INVENTOR.
KENDRICK AND STOLZY
BY
ATTORNEYS.

July 16, 1968  W. D. CRAMER  3,392,890
PLIABLE MATERIAL SUPPORTING METHOD AND APPARATUS
Filed Sept. 13, 1963  4 Sheets-Sheet 2

WILLIAM DUNCAN CRAMER
INVENTOR.
KENDRICK AND STOLZY
BY
ATTORNEYS.

July 16, 1968 W. D. CRAMER 3,392,890
PLIABLE MATERIAL SUPPORTING METHOD AND APPARATUS
Filed Sept. 13, 1963 4 Sheets-Sheet 3
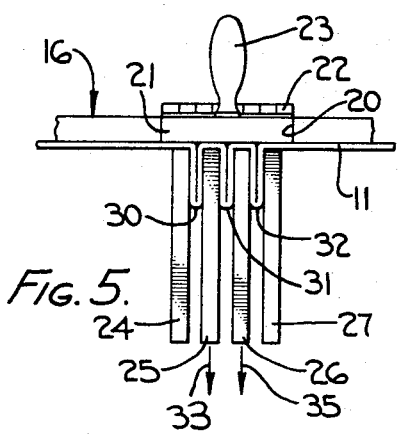
FIG. 5.
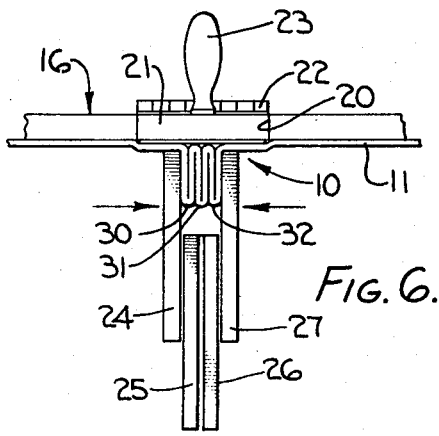
FIG. 6.
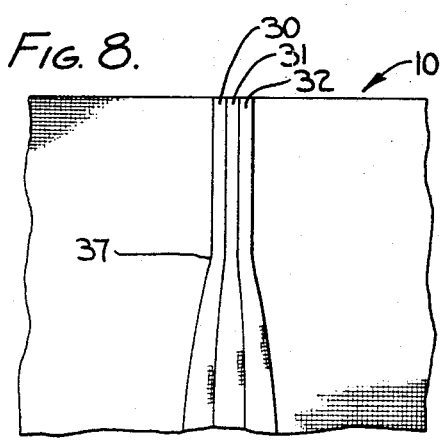
FIG. 8.
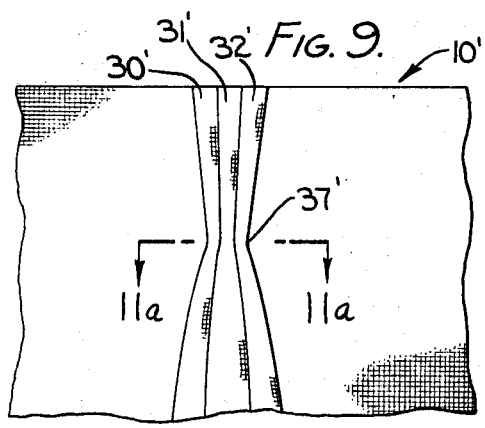
FIG. 9.
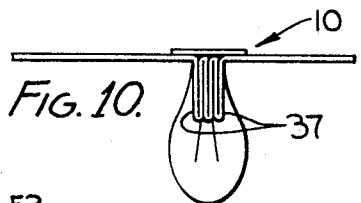
FIG. 10.
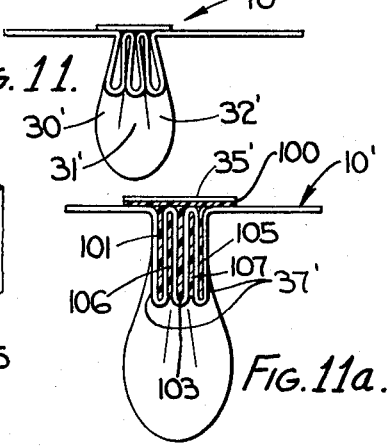
FIG. 11.
FIG. 11a.
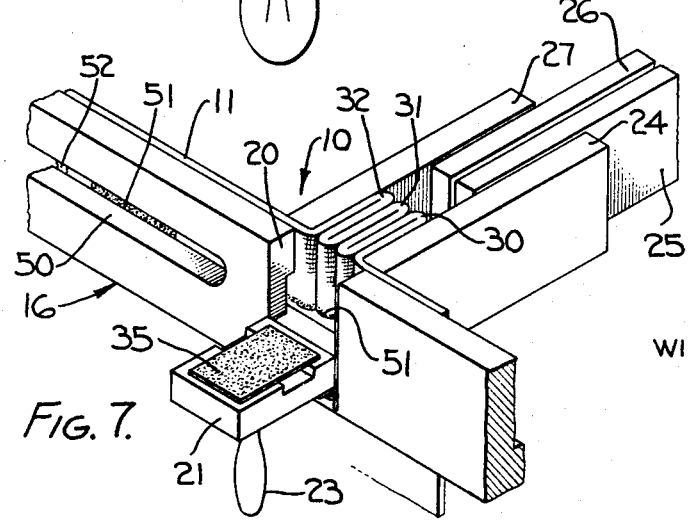
FIG. 7.
WILLIAM DUNCAN CRAMER
INVENTOR.
KENDRICK AND STOLZY
BY
ATTORNEYS.

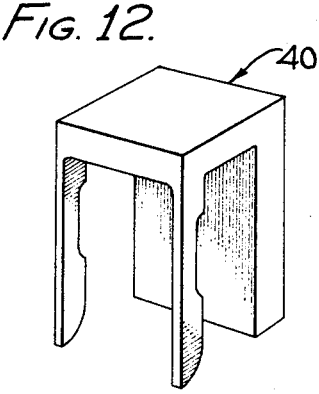
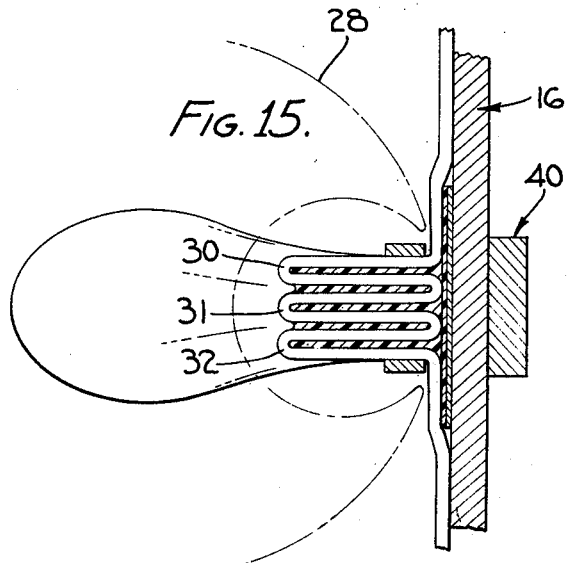
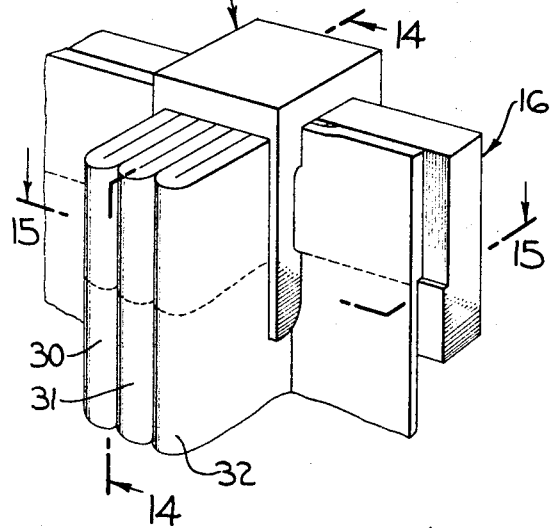
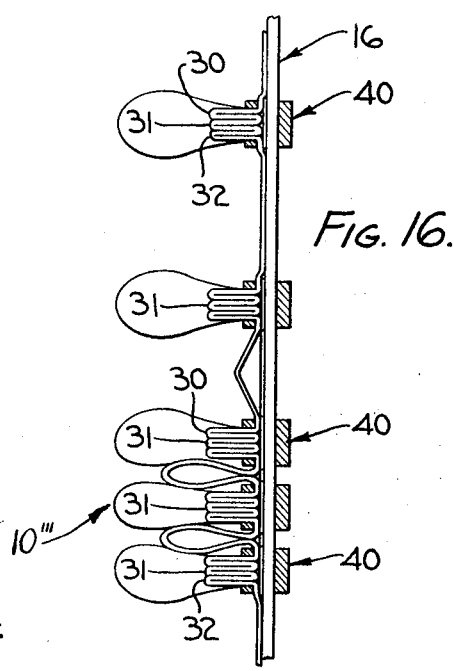
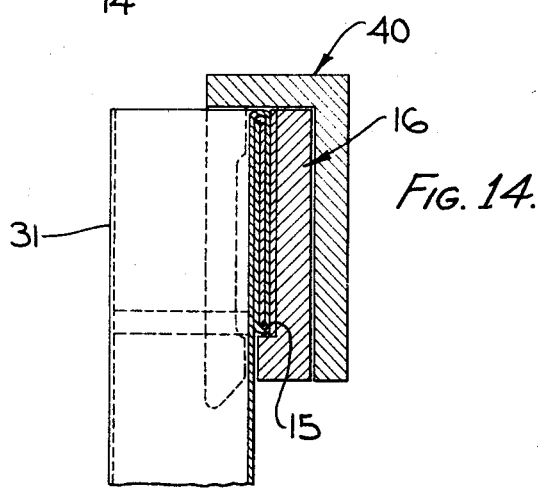

United States Patent Office 3,392,890
Patented July 16, 1968

3,392,890
PLIABLE MATERIAL SUPPORTING
METHOD AND APPARATUS
William D. Cramer, Los Angeles, Calif., assignor to
Wm. A. Cruikshank, Jr.
Filed Sept. 13, 1963, Ser. No. 308,765
7 Claims. (Cl. 223—28)

This invention relates to the art of manipulating relatively long pliable sheet materials such as draperies and the like, and more particularly to a method of and apparatus for supporting the same in a manner such that fabrication thereof may be easily and quickly accomplished.

Although the present invention may have a much larger scope of application than that specifically disclosed herein and should not therefore be limited thereto, it has been found to be especially useful in making pleats known as French pleats in the hemmed heading of draperies.

In the past, most all French pleats have been made entirely by hand or with a minimum amount of equipment that may be manually, or automatically or semi-automatically operated. This has made the manufacture of French pleated draperies substantially a custom fabrication of an exceedingly high cost.

It is difficult to mechanize the prior art French pleating method because of the pliable character and the sheer mass of draperies. That is, the flexibility of the fabric and the length and weight of a drapery make it very difficult for a drapery to be manipulated. A large amount of material must be moved easily and efficiently while several intricate operations are performed in pleating the heading of a drapery.

The present invention overcomes the above described and other disadvantages of the prior art by providing a method of manipulating the hemmed heading of pliable sheet material, the heading having a shoulder, this method including the step of supporting the sheet material on the shoulder of the hem.

In accordance with the present invention, a drapery may be supported on the shoulder of the hem in a manner such that the entire length thereof hangs vertically and hangs free in the space below the point of support thereof and in the space above and spaced upwardly from the floor. The entire drapery including the hemmed heading thereof may thus be easily and freely manipulated to fabricate French pleats and properly distribute the resultant fullness of the panel.

The above-described and other advantages of the present invention will be better understood from the following description when considered in connection with the accompanying drawings.

In the drawings which are to be regarded as merely illustrative:

FIG. 1 is a broken away perspective view of a hemmed heading of a drapery;

FIG. 2 is a broken away perspective view of apparatus which may be employed to make French pleats in the heading hem of the drapery panel shown in FIG. 1;

FIG. 3 is a perspective view of an alternative pleat which may be made with the apparatus shown in FIG. 2;

FIG. 4 is another perspective view of a portion of the apparatus shown in FIG. 2;

FIG. 4b is a perspective view of a rear portion of the drapery shown in FIG. 4a;

FIG. 5 is a top plan view of the apparatus shown in FIG. 2 illustrating two method steps of the present invention;

FIG. 6 is a top plan view of the apparatus shown in FIG. 2 illustrating a further step of the method of the present invention;

FIG. 7 is a broken away perspective view of the apparatus similar to that shown in FIG. 4;

FIGS. 8 and 9 are broken away front elevational views of draperies which may be made in accordance with the present invention;

FIGS. 10 and 11 are top plan views of the draperies shown in FIGS. 8 and 9, respectively;

FIG. 11a is a transverse sectional view of a portion of a French pleat taken on the line 11a—11a shown in FIG. 9;

FIGS. 12 and 13 are respective views of pleated drapery retaining apparatus;

FIG. 14 is a transverse sectional view taken on the line 14—14 of the apparatus shown in FIG. 13;

FIG. 15 is a longitudinal sectional view taken on the line 15—15 of the apparatus shown in FIG. 13; and FIG. 16 is a top plan view of the apparatus shown in FIG. 4.

Figure 4A:
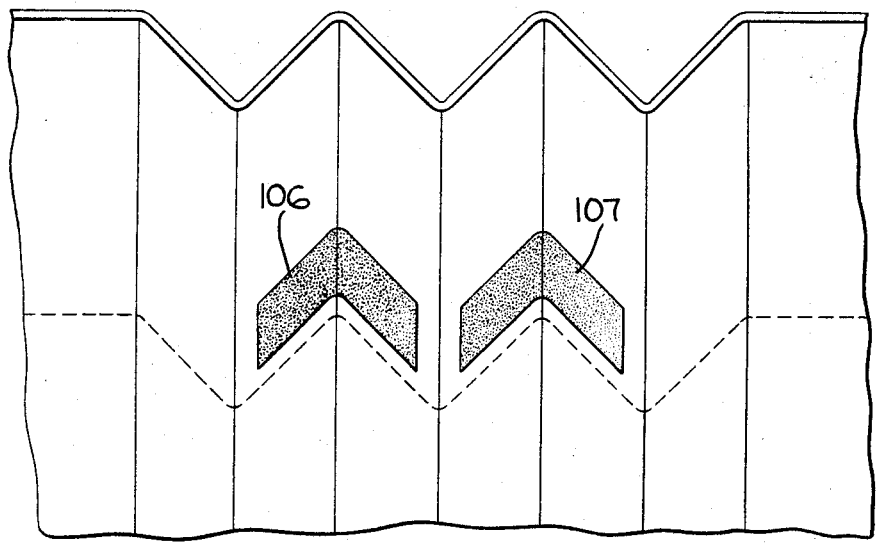
FIG. 4a is a perspective view of the front portion of a partially folded drapery.

In the drawings in FIG. 1, a drapery is indicated at 10 including a heading 11 which surrounds a buckram or other stiffening member 12 and is hemmed or blind stitched at 13 to provide a shoulder of the hem as at 14.

Conventional draperies are made in accordance with the construction illustrated at FIG. 1, that is, the heading of a drapery is hemmed with a stiffening material fixed thereto, and in such a case, a shoulder of the hem is thereby formed.

In accordance with the present invention, the shoulder of the hem which is formed by hemming the heading of a conventional drapery, such as the drapery 10, is utilized to support the drapery vertically and freely while the heading is being manipulated by the method and apparatus of the present invention. In particular, as shown in FIG. 2, the shoulder of the hem 14 of drapery 10 is supported on a shoulder 15 of a member 16 that is provided with an extended guide surface 17 against which the hemmed side of heading 11 rests.

As shown in FIG. 2, at the initial stages of supporting drapery 10, a guide member 18 may be provided which allows that portion of drapery 10 indicated at 19 to hang downwardly but not pinched between shoulder 15 and guide 18 while guide 18 holds heading 11 against guide 17, whereby shoulder of the hem 14 is forced to rest upon shoulder 15. Guide 18 is fixed relative to guide 17. Both guides 17 and 18 may be fixed to and suspended from the ceiling of a room if desired.

Member 16 is cut away, for example, as indicated at 20 in FIG. 7, into which space a block 21 is rotatable on a hinge 22 shown in FIG. 4. A handle 23 is provided to rotate block 21. Pressure members 24, 25, 26 and 27 are provided, as shown in FIG. 2, to form French pleats in the heading 11 of drapery 10. A wheel 28 is provided to draw drapery 10 along on shoulder 15 of member 16 in the direction of arrow 29. Members 24, 25, 26, 27 and wheel 28 may be mounted on any convenient means or supported and moved or operated manually.

As shown in FIGS. 4 and 7, member 17 may be provided with a slot 50 through which strips of cement at 51 and 52 and so forth may be applied to the back of the drapery 10 to bind the same together when it is folded within the folds upon itself at a point indicated at 37 in FIG. 8 and at 37' in FIGS. 9 and 11a. In making French pleats to look like the drapery 10', shown in FIGS. 9 and 11a, it is conventional to sew the drapery heading at the point 37' to give the effect shown. When the drapery is so sewn, this fabricated seam is called the bar tacking.

In FIG. 3, note will be taken that the back of fold 31" may be secured forward of the back of folds 30" and 32".

Note will be taken that in FIGS. 8 and 10 folds 30, 31 and 32 become full beginning at a point 37 below which the pleats hang free from pressure members 24 and 27 and shoulder of the hem.

After drapery 10 is hung, it may appear as at 10' in FIGS. 9 and 11 having diverging folds 30' diverging from a point 37', at which point folds 30' are held together by cement.

In FIG. 11a, it may be noted that patch 35' is provided with adhesive at 100 to hold the rear portions of the folds together. Cement is also provided at three positions, 101, 103 and 105, to provide the pinched or bar tacking effect as indicated at 37' in FIG. 9. This effect is further facilitated by the use of cement at 106 and 107 as shown in FIG. 11a.

Cement at 106 and 107 is supplied to the front portion of the drapery panel before the folds are made. Cement at 101, 103 and 105 is indicated both in FIG. 4b and in FIG. 11a.

A clip 40 is shown in FIG. 12 which may be employed to hold pleated drapery 10 on shoulder 15 of member 16 as indicated in FIGS. 13 to 16, inclusive. Note will be taken in FIGS. 13 and 14 that clip 40 is slidable in a straddling position over the top of member 16. The clip 40 may straddle folds 30, 31 and 32. Wheel 28 may then straddle clip 40 as shown in FIG. 15. Clip 40 may be applied in a manner to hold drapery 10 on member 16 within wheel 28 when wheel 28 is in the position shown in FIG. 15. Drapery 10 may be collected then as indicated at unloading position 10''' as shown in FIG. 16.

From the foregoing, it will be appreciated that only the bare essentials of the apparatus of the present invention have been illustrated and that any number of means may be employed to move automatically the particular structure shown in FIG. 2.

Figure 4B:
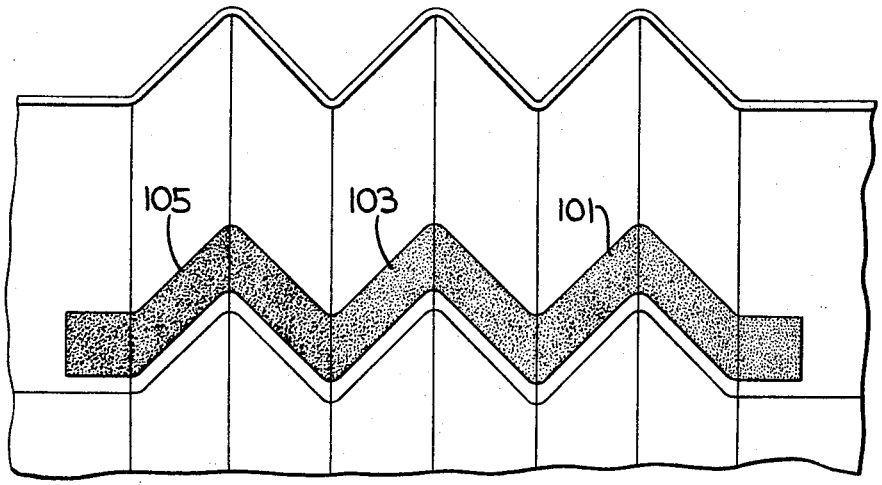

In the initial stages of operation, the drapery heading 11 is inserted into the space between members 16 and 18 at their far right ends as viewed in FIG. 2. Heading 11 is then moved manually along the apparatus in between the ends of members 27, 26, 25 and 24 and the side of member 16 until its leading edge is engaged by the point wheel 28. In this case, the ends of members 27, 26, 25 and 24 are spaced from member 16 a distance barely large enough to permit the movement of the hem therethrough. The heading 11 and drapery 10 are now positioned for the pleating operation. Shoulder 14 rests on shoulder 15. Heading 11 is backed by 17. Shoulder 14 is maintained on shoulder 15 by guide 18, members 27, 26, 25, 24 and wheel 28. The drapery 10 hands suspended vertically free in the space below member 16 and guide 18 and members 27, 26, 25, 24 and wheel 28. The balance of the pleating operation now follows in proper sequence. Cement 101, 103, 105, 106 and 107 in FIGS. 4a and 4b, is then deposited on drapery 10 as shown at 51 in FIGS. 2, 4 and 7.

Pressure members 24, 25, 26 and 27 are located against heading 11 to hold the same against guide 17 in suitably spaced positions along the length thereof between guide 18 and wheel 28. Note will be taken that pressure members 24, 25, 26 and 27 are located contiguous to member 16 and above shoulder 15 both to move drapery 10 by friction and to hold heading 11 on shoulder 15.

At this point, pressure member 25 is withdrawn from between folds 30 and 31 as indicated by arrow 33. At the same or a subsequent time, pressure member 26 is withdrawn from the space between folds 31 and 32 in a direction as indicated by arrow 35 in FIG. 5.

At a time subsequent to the withdrawal of pressure members 25 and 26 from between folds 30, 31 and 31, 32, respectively, pressure members 24 and 27 are moved closer together, at least one toward the other, to make the pleat of heading 11 formed by folds 30, 31 and 32 still tighter as shown in FIG. 6.

The previously deposited cement at this time acts to cement the several folds which are additionally secured by adhesive patch 35, etc.

At this point, block 21 is pulled downwardly by handle 23 to the position shown in FIG. 7 and an adhesive patch 35 is placed on block 21 and sharply pressed against heading 11 at the position of folds 30, 31 and 32 by rapidly rotating block 21 to the position shown in FIG. 4. The adhesive patch 35 thus secures the folds 30, 31 and 32 approximately in the position shown in FIG. 8, and at 10'' in FIG. 4, and as in the plan views of FIGS. 10 and 11. The pleated hem and panel thereunder are pulled from the right as viewed in FIG. 2 by wheel 28. Wheel 28 then pushes the hem and panel to the left as viewed in FIG. 2 to the unloading position 10''' shown in FIG. 16. The pleated heading is then held on member 16 by clips 40. The finished drape is then bundle tied and removed from the apparatus by removing the several clips 40 from the member 16.

Note will be taken that wheel 28 is provided with recesses 36 to receive each of the three folds of each pleat so made in heading 11. Note will also be taken that shoulder 15 of member 16 supports drapery 10 under the shoulder of the hem not only along the unpleated length of heading 11, but also along the pleated length thereof after the same has been pleated in the manner shown in FIGS. 12, 13, 14 and 15.

Note will be taken that adhesive at 106 and 107 may be supplied to a drapery heading in excatly the same manner that adhesive 51 is supplied thereto through slot 50. For this purpose, a slot 50' is provided in guide member 18 as shown in FIG. 2. Adhesive at 51' is supplied to a drapery heading through slot 50' shown in FIG. 2.

In accordance with the foregoing, drapery 10 may be supported on shoulder of the hem 14 in a manner such that the entire length of drapery 10 hangs freely above the floor. In such a case, the entire drapery 10 and the heading 11 thereof may be easily and freely manipulated to fabricate French pleats in draperies as indicated in FIGS. 9 and 11.

I claim:

1. The method of making a pleated hem for a pliable sheet material having a shoulder of the hem, said method comprising the steps of: loading said material on a supporting member, said member being positioned under said shoulder of the hem, a guide being located on one side of said member to contact the hemmed side of said material; pressing the side of said material opposite the hemmed side against said guide at least at two spaced points therealong to hold said hem on said member; moving said hem on said member at one of said points toward the other to gather said hem into a fold; and securing said fold in its gathered position.

2. The method of making a pleated hem for a pliable sheet material having a shoulder of the hem, said method comprising the steps of: loading said material on a supporting member, said member being positioned under said shoulder of the hem, a guide surface being located on one side of said member to contact the hemmed side of said material; pressing the side of said material opposite the hemmed side against said guide surface at least at two spaced end points and at an intermediate point spaced from said end points therealong to hold said hem on said member; moving said hem at all of said points together to gather said hem into a plurality of folds while still pressing said hem against said guide surface to hold the same on said member; releasing pressure on said intermediate point; moving said hem at said end points on said member to a position closer together; and securing said folds in their gathered positions.

3. Apparatus for supporting the hem of a pliable sheet material having a shoulder of the hem, said apparatus comprising: a member having a shoulder projecting horizontally therefrom at a position spaced from the top thereof adapted to lie under said shoulder of the hem; means located adjacent to said member to hold said hem against said member, whereby said material is supported on said member shoulder at said shoulder of the hem; at least two projection means mounted adjacent said member movable toward and away from said member above said member shoulder to press forceably said hem against said member and movable laterally relative one to another to gather said hem into a fold while holding said hem against said member.

4. Apparatus for supporting the hem of a pliable sheet material having a shoulder of the hem, said apparatus comprising: a member having a shoulder projecting horizontally therefrom at a position spaced from the top thereof and located to lie under said shoulder of the hem; means to hold said hem against said member, whereby said material is supported on said member shoulder at said shoulder of the hem; at least three projection means mounted adjacent said member movable toward and away from said member above said member shoulder to press forceably said hem against said member and movable laterally relative to each other to gather said hem into at least two adjacent folds while holding said hem against said member, one of said projection means being located intermediate the other projection means and movable outwardly of said folds and the end ones of said projection means being subsequently movable one toward the other to gather said folds.

5. Apparatus for supporting the hem of a pliable sheet material having a shoulder of the hem, said apparatus comprising: a member having a shoulder projecting horizontally therefrom at a position spaced from the top thereof to receive said shoulder of the hem thereon; first means at each end of a working length of said member to hold said hem against said member with said shoulder of the hem on said member shoulder, said first means including second means to pull said hem along said working length of said member; and third means positioned along said working length of said member to gather said hem into folds, said third means including at least two projection means movable toward and away from said member above said member shoulder to press forceably said hem against said member and move laterally relative one to another to gather said hem into a fold while holding said hem against said member.

6. Apparatus for supporting the hem of a pliable sheet material having a shoulder of the hem, said apparatus comprising: a member having a shoulder projecting horizontally therefrom at a position spaced from the top thereof for receiving said shoulder of the hem thereon; first means at each end of a working length of said member to hold said hem against said member with said shoulder of the hem on said member shoulder, said first means including second means to pull said hem along said working length of said member; and third means positioned along said working length of said member to gather said hem into folds, said third means including at least three projection means disposed adjacent said member movable toward and away from said member above said member shoulder to press forceably said hem against said member and movable laterally to gather said hem into at least two adjacent folds while holding said hem against said member, one of said projection means being intermediate the other two projection means and movable outwardly of said folds, and the end ones of said projection means being subsequently movable relative to each other to gather said folds.

7. The method of making a pleated hem for a pliable sheet material having a shoulder on the hem, said method comprising the steps of:

loading said material on a supporting member in a loading position to allow the entire length of said material to hang vertically and freely, said member being positioned under said shoulder to support the entire weight of said material thereon;

transporting and guiding the hem of said material from the loading position to a working position;

gathering said hem into folds at said working position;

securing said folds of said material at said working position in their gathered positions;

and transporting and guiding said gathered and secured folds on said member to an unloading position.

References Cited

UNITED STATES PATENTS

| | | | |
|---|---|---|---|
| 46,944 | 3/1865 | Rose | 223—28 |
| 564,893 | 7/1896 | Kippels et al. | 223—30 |
| 3,134,348 | 5/1964 | Kalder | 112—427 |
| 2,648,379 | 8/1953 | Bishop | 223—30 X |
| 1,271,266 | 7/1918 | Bearmore | 38—143 |
| 1,321,930 | 11/1919 | McClure | 156—272 X |
| 2,801,671 | 8/1957 | Vaughan et al. | 156—204 |
| 2,976,625 | 3/1961 | Bazelmans | 38—2 |
| 3,163,352 | 12/1964 | Fesco | 93—35 X |
| 3,166,456 | 1/1965 | White et al. | 156—204 X |

JORDAN FRANKLIN, *Primary Examiner.*

G. V. LARKIN, *Assistant Examiner.*